(No Model.) 2 Sheets—Sheet 1.

A. ELMENDORF.
FLUSHING ATTACHMENT FOR WATER CLOSETS.

No. 443,625. Patented Dec. 30, 1890.

Attest:
Geo. T. Smallwood.
Alvin Belt.

Inventor:
Albert Elmendorf.
By A. M. Smith & Son, attys.

(No Model.) 2 Sheets—Sheet 2.
A. ELMENDORF.
FLUSHING ATTACHMENT FOR WATER CLOSETS.
No. 443,625. Patented Dec. 30, 1890.
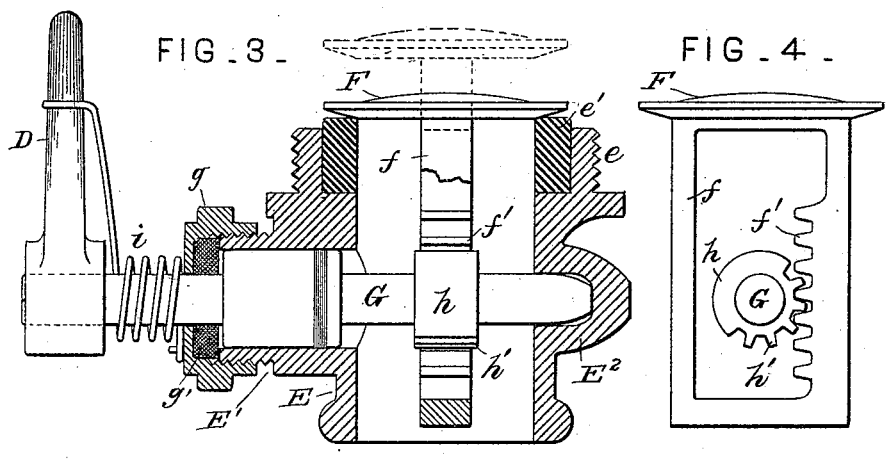
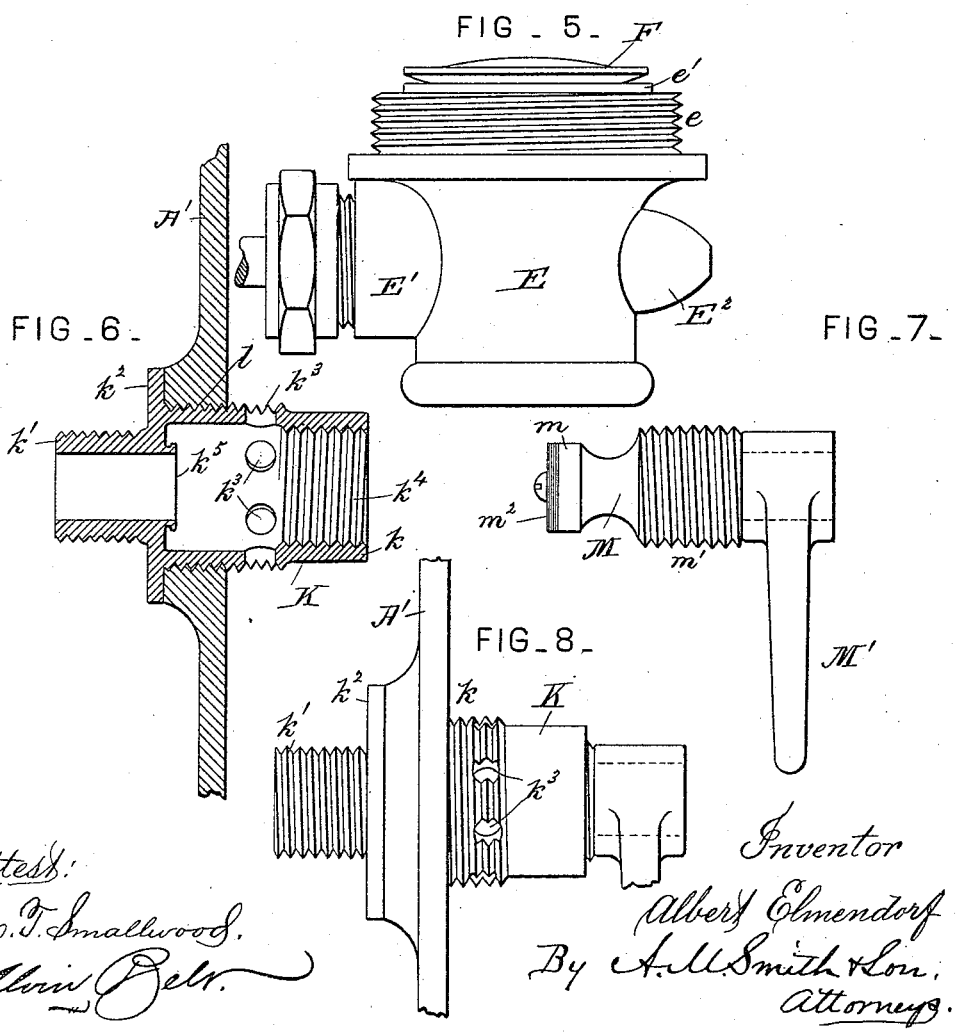
Attest:
Geo. T. Smallwood.
Alvin Belt.
Inventor
Albert Elmendorf
By A. M. Smith & Son.
Attorneys.

UNITED STATES PATENT OFFICE.

ALBERT ELMENDORF, OF NEW LONDON, CONNECTICUT, ASSIGNOR, BY DIRECT AND MESNE ASSIGNMENTS, TO THE ELMENDORF WATER CLOSET APPARATUS COMPANY, OF CONNECTICUT.

FLUSHING ATTACHMENT FOR WATER-CLOSETS.

SPECIFICATION forming part of Letters Patent No. 443,625, dated December 30, 1890.

Application filed June 23, 1890. Serial No. 356,360. (No model.)

*To all whom it may concern:*

Be it known that I, ALBERT ELMENDORF, of New London, county of New London, and State of Connecticut, have invented a new and useful Improvement in Flushing Attachments to Water-Closets, of which the following is a full, clear, and exact description, reference being had to the accompanying drawings, making part of this specification.

My invention relates to an improvement in the stand-pipe form of flushing attachments to water-closets upon which Letters Patent were granted to me July 3, 1888, No. 385,409, and June 4, 1889, No. 404,393; and it consists in a novel construction of the water-service or supply-valve and flushing-valve in the manner of connecting the supply-valve with the float in the stand-pipe for making it automatic in its action, and in certain details of construction and arrangement of parts hereinafter fully described and claimed.

Figure 1:
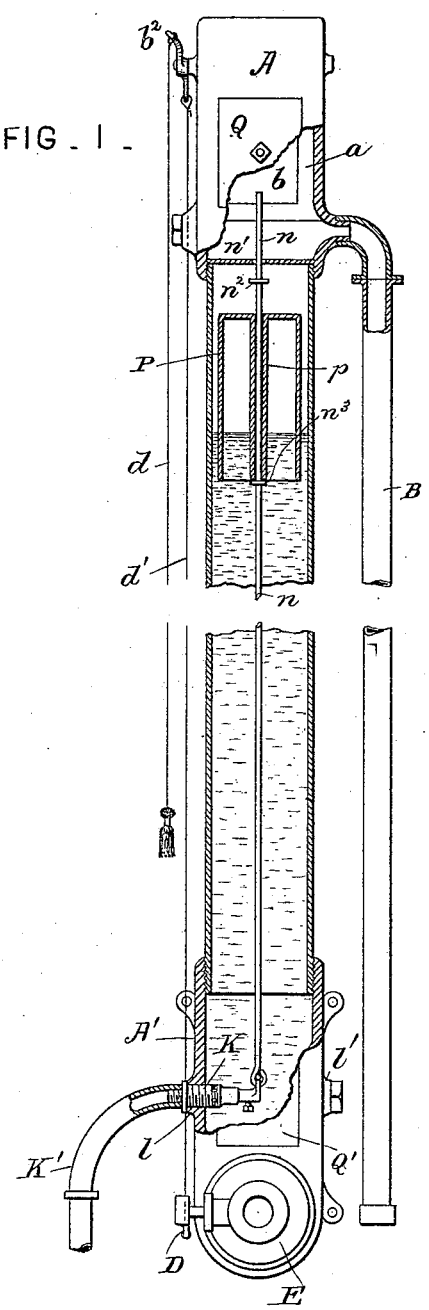
Figure 2:
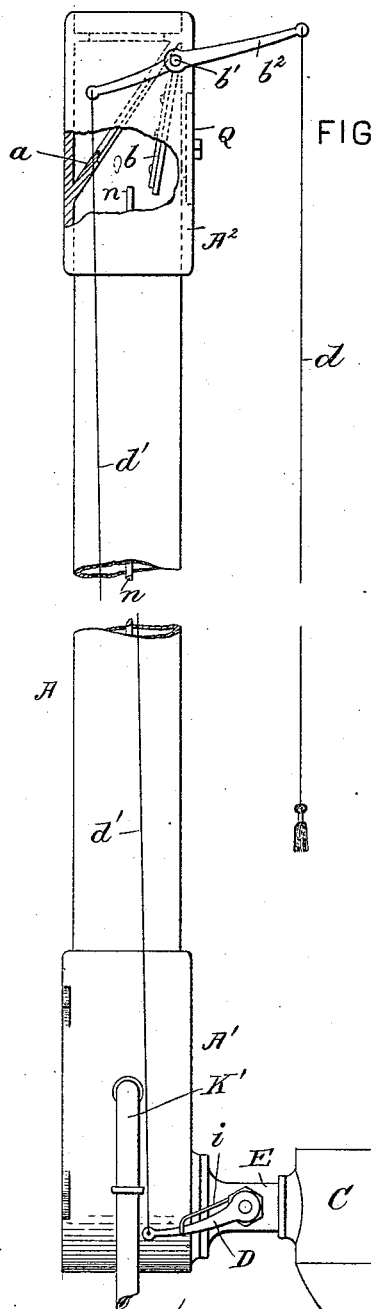

In the accompanying drawings, Figure 1 represents my improved stand-pipe in vertical section with portions thereof and of the attachments thereto in front elevation. Fig. 2 is a side elevation, partly in section, showing the flushing-connection of the stand-pipe with the bowl, the latter being shown in part only. Fig. 3 represents a section through the flushing-valve chamber, showing the valve in side elevation; Fig. 4, a side view of the valve and its actuating-segment, and Fig. 5 a plan or side view of the valve complete. Fig. 6 represents a section through the supply-valve chamber; Fig. 7, the valve detached, and Fig. 8 a plan view of said valve complete.

A indicates the stand-pipe, which may be of any desired diameter and length; A', the lower valve-chamber extension thereof, made, preferably, rectangular or polygonal in form on its outer face for convenience in coupling the supply and flushing pipes thereto; and $A^2$, the upper valve-chamber, connecting the stand-pipe with its ventilating-extension in a manner similar to that described in my former patents referred to, and also preferably made rectangular in form for the reason explained. B is the ventilating-pipe connecting the bowl (indicated at C) with the ventilating-extension or valve-chamber $A^2$.

The valve-chamber $A^2$ is provided with a perforated diaphragm $a$, preferably inclined, as shown, and having a central opening controlled or covered or uncovered by a valve $b$, pivoted at one side in the chamber, the pivot $b'$ thereof extending through the wall of the chamber and having a lever $b^2$ fast on one end for controlling the valve. The outer end of the lever $b^2$ has a pull-cord $d$, connected with it, and the inner end, extending beyond the pivot $b'$, is connected by a cord or chain $d'$ with the lever D, actuating the flushing-valve, so that when the lever $b^2$ is vibrated for operating the valve $b$ to close the opening in the diaphragm $a$, and so closing communication between the stand-pipe and the ventilating-extension thereof, the flushing-valve will by the same operation be opened for the flushing-bowl.

The construction of the flushing-valve is shown in Figs. 3, 4, and 5, E indicating a short section-pipe screw-threaded at one end at $e$ to engage a screw-threaded perforation in the wall of the valve-chamber A', and suitably formed at its opposite or outer end for connection with the bowl C in any usual manner. The inner wall of the threaded end of this pipe-section is recessed to receive a packing-ring $e'$, forming an annular seat for the valve F, and intermediate its ends the section E has a perforated boss E' on one side and opposite thereto a spur $E^2$, socketed in its inner face, and in said boss and spur a rock-shaft G is journaled, secured in place by means of a screw-threaded cap $g$ and suitable packing $g'$, as shown, or in any suitable manner.

The valve F has a slotted or open rectangular stem $f$ formed on its inner face, of a width to fit snugly and slide within the pipe E, and one wall of the slot in this stem has a toothed rack $f'$ formed on it, with which the teeth $h'$ of a segment $h$, fast on the rock-shaft G, engage for actuating the disk-valve F and drawing it snugly down on the packing-ring $e'$ or thrusting it outward therefrom.

The shaft G has a lever D fast on its outer end, connected by a cord or chain $d'$ with the lever $b^2$, as explained, for opening the valve, a spring $i$ of any suitable form and arrangement acting on the lever D, to close the valve F when the pull-cord $d$ is released.

K indicates a section of pipe or coupling-piece forming an inlet-valve chamber and connection between the service-pipe and the valve-chamber $A'$. The inner portion of this coupling-piece $k$, constituting the inlet-valve chamber, is of a greater diameter than the outer part $k'$, to which the service-pipe $K'$ is connected, and both are screw-threaded on their outer faces, the latter $k'$ for receiving the service-pipe and the part $k$ to engage a screw-threaded perforation at $l$ or $l'$ in the side wall of the valve-chamber $A'$. The two parts $k$ and $k'$ of the coupling K unite in a flange $k^2$, which, when the part $k$ is screwed in place, abuts snugly against the perforated boss on the valve-chamber or stand-pipe, as shown in Figs. 1, 6, and 8. The part $k$ extends through the wall of and within the valve-chamber or stand-pipe, to which it is secured, and at a point inside thereof is provided with a series of perforations $k^3$, arranged in a circle radiating from the central chamber. The inner end of the part $k$ is screw-threaded at $k^4$ on its inner face to receive the screw-threaded stem $m'$ of the valve $m$. The inner end of the part $k'$ of the coupling K extends within the chambered part $k$ to form an annular seat $k^5$ for the valve $m$, which is provided with suitable packing-washers $m^2$, adapting it to fit snugly against the seat $k^5$ when operated to shut off the water-supply. Between the valve $m$ and the screw-threaded portion $m'$ the valve shank or stem M is cut away to permit the free passage of the water to the perforations $k^3$ when the valve is opened or withdrawn. The inner end of the valve-stem has a lever $M'$ secured to it, located within the stand-pipe, and from this lever a rod $n$ extends up through the stand-pipe and through a guiding-perforation in a bar or diaphragm $n'$ at the upper end of said pipe. The upper end of the rod $n$ extends within the valve-chamber $A^2$, and when raised is just within the reach of the swinging end of the valve $b$, for a purpose that will appear. The rod $n$ below the guiding bar or diaphragm $n'$ has two knobs or collars $n^2$ and $n^3$ fast on it, the upper one $n^2$ of which serves to limit the upward movement of the rod, and between these two knobs a float P is arranged to slide on the rod. Any suitable form of float may be used; but I prefer to employ one cylindrical in form, open on its lower end to permit the water to enter and partly fill it, closed on its upper end to cause the air to be compressed in the cylinder by the action of the water, and having a central tube $p$, fitting and sliding on the rod $n$ between the knobs $n^2$ and $n^3$. By this arrangement as the water rises to near the top of the stand-pipe it lifts the float P against the knob $n^2$, and, acting on the rod $n$ to raise it, the lever $M'$ is vibrated upward and rotates the valve-stem and the valve $m$ to close it and shut off the water-supply. When the flushing-valve is opened and the water falls in the stand-pipe, ordinarily the weight of the rod $n$ and of the float P, falling with the water and resting with the knob $n^3$, will be sufficient to vibrate the lever $M'$ for opening the supply-valve; but to insure the fall of the rod and proper opening of the supply-valve the ventilator-valve $b$ as it opens downward strikes the upper end of the rod $n$ and forces it downward, thereby causing the opening of the valve $m$. The positive shutting off of the water-supply is regarded as an important improvement over the comparatively uncertain action of the float-valve heretofore employed by me, and the separation of the flushing and supply valves renders the action of both more satisfactory than where the two are united, as in my later patent referred to.

Hand-holes with suitable covers Q Q are provided for giving access to the valves within the valve-chambers $A'$ and $A^2$ where required.

Where the stand-pipe employed is a large one and the flushing-valve opening correspondingly large, the latter may be made to serve as a hand-hole for the chamber $A'$.

Having now described my invention, I claim as new—

1. The combination, with a stand-pipe having a ventilating-chamber communicating therewith and a ventilating-pipe connecting said chamber with the bowl, of a supply-valve located in the stand-pipe, a flushing-valve also in the stand-pipe, and a ventilating-valve in the ventilating-chamber, the flushing-valve and ventilating-valve being connected for joint operation, substantially as described.

2. The combination, with the stand-pipe of a water-closet flushing apparatus, of a flushing-valve located inside said stand-pipe, an independent supply-valve located in said stand-pipe, the float, and the rod also arranged within said stand-pipe and connecting said float with the supply-valve for automatically opening and closing the latter, substantially as described.

3. The combination, in a water-closet flushing apparatus, of the stand-pipe, the flushing-valve interposed between the bowl and said stand-pipe, the independent water-supply valve, the rod connecting said float and valve, and the ventilating-valve arranged to act on said rod for causing the latter to open the supply-valve, substantially as described.

4. The combination, in a water-closet, of a stand-pipe having a ventilating-extension and a ventilating-valve therein, a ventilating-pipe connecting the bowl with said stand-pipe, the flushing-valve and the independent supply-valve connected with said stand-pipe, the float for actuating said supply-valve, and the ventilating-valve connected to and operated simultaneously with the flushing-valve, substantially as described.

5. The combination, with the flushing stand-pipe, of the combined water-supply coupling-valve and valve-seat, made in two parts K and M, the chamber part K containing the valve-seat $k$ and screwing into the stand-pipe and the part M having the valve $m^2$ screwing into the part K within said stand-pipe and provided with the lever for actuating it, located within the stand-pipe, the float, and the rod connecting said lever and float for actuating the supply-valve, substantially as described.

In testimony whereof I have hereunto set my hand this 19th day of June, A. D. 1890.

ALBERT ELMENDORF.

Witnesses:
EDGAR C. STODDARD,
C. W. BUTLER.